United States Patent [19]

Warner

[11] Patent Number: 5,237,774
[45] Date of Patent: Aug. 24, 1993

[54] CONTAINER FOR GRANULAR INSECTICIDE

[75] Inventor: William B. Warner, Chandler, Ariz.

[73] Assignee: Farnam Companies, Inc., Phoenix, Ariz.

[21] Appl. No.: 796,803

[22] Filed: Nov. 25, 1991

[51] Int. Cl.$^5$ .................................................. A01M 25/00
[52] U.S. Cl. ....................................................... 43/131
[58] Field of Search ............................................. 43/131

[56] References Cited

U.S. PATENT DOCUMENTS

| | | |
|---|---|---|
| 3,147,565 | 9/1964 | Moore .................................. 43/131 |
| 3,828,464 | 8/1974 | Peace .................................. 43/131 |
| 4,021,965 | 5/1977 | Norris ................................. 43/131 |
| 4,065,872 | 1/1978 | Patton ................................. 43/131 |
| 4,400,904 | 8/1983 | Baker .................................. 43/131 |

FOREIGN PATENT DOCUMENTS

| | | | |
|---|---|---|---|
| 0100730 | 2/1984 | European Pat. Off. .............. | 43/131 |
| 2039577 | 2/1972 | Fed. Rep. of Germany ........ | 43/131 |
| 2821378 | 11/1979 | Fed. Rep. of Germany ........ | 43/131 |
| 692000 | 10/1930 | France .................................. | 43/131 |
| 1008282 | 5/1952 | France .................................. | 43/131 |

*Primary Examiner*—Kurt C. Rowan
*Attorney, Agent, or Firm*—Joseph H. Roediger

[57] ABSTRACT

A container for granular insecticide having a central chamber with a narrow rectangular cross sectional area. A multiplicity of rectangular slots are formed in rows and columns in the chamber to provide access to the insecticide and also enhance its attractantcy properties. The slots are dimensioned to contain the granular material while permitting access thereto by the feeding parts of the insects.

4 Claims, 3 Drawing Sheets

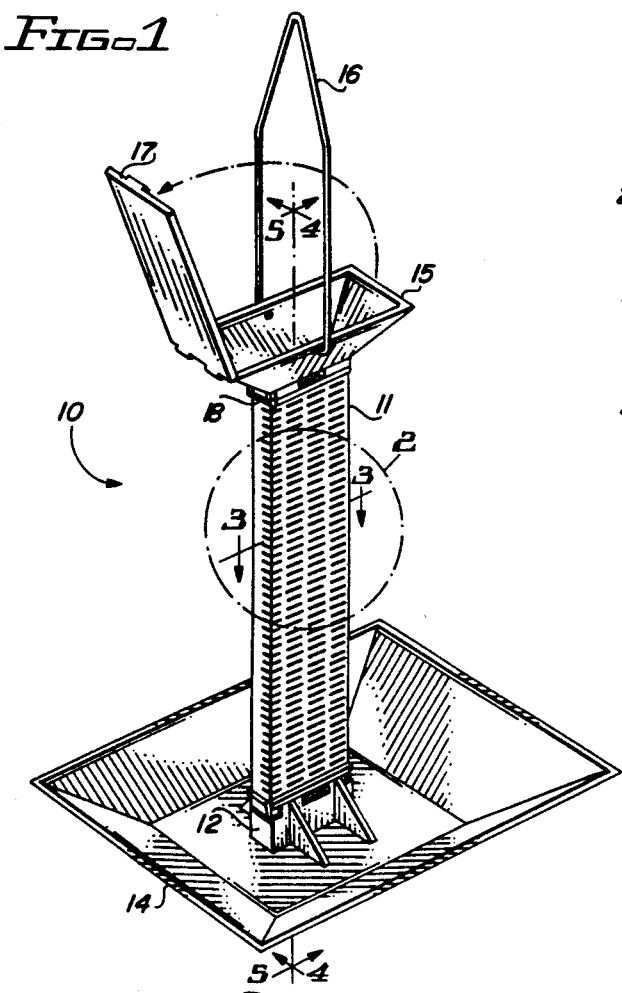
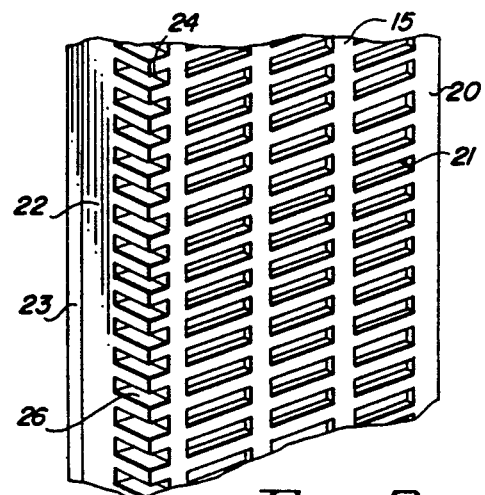
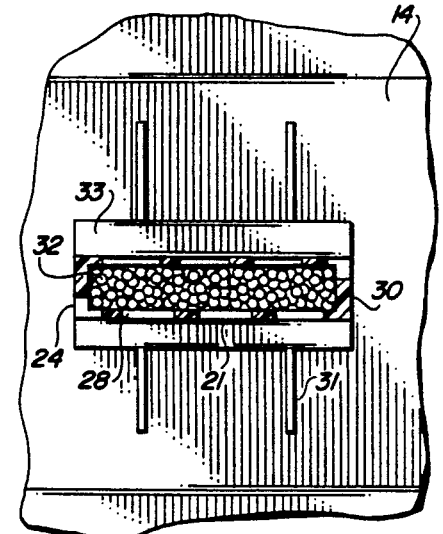
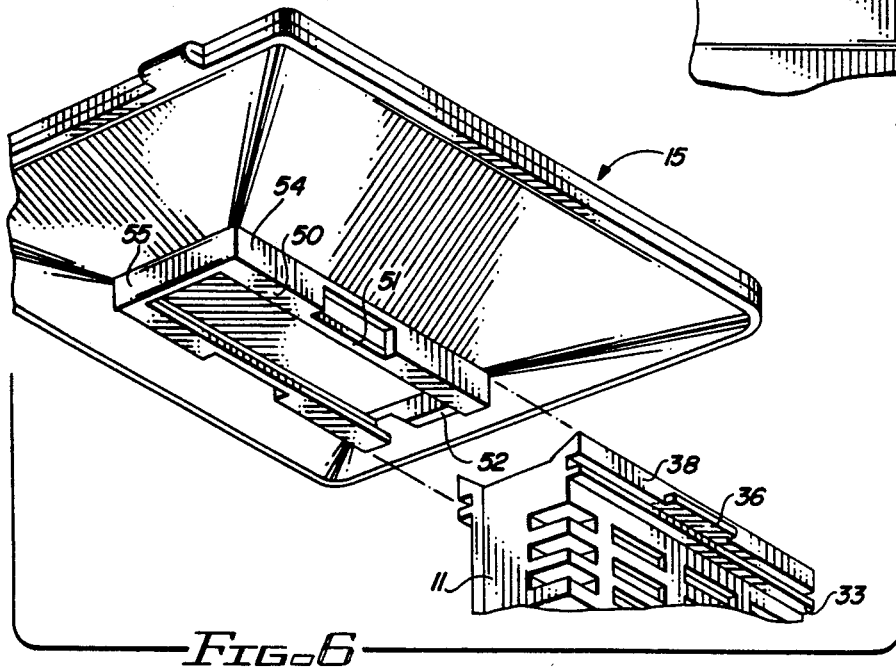

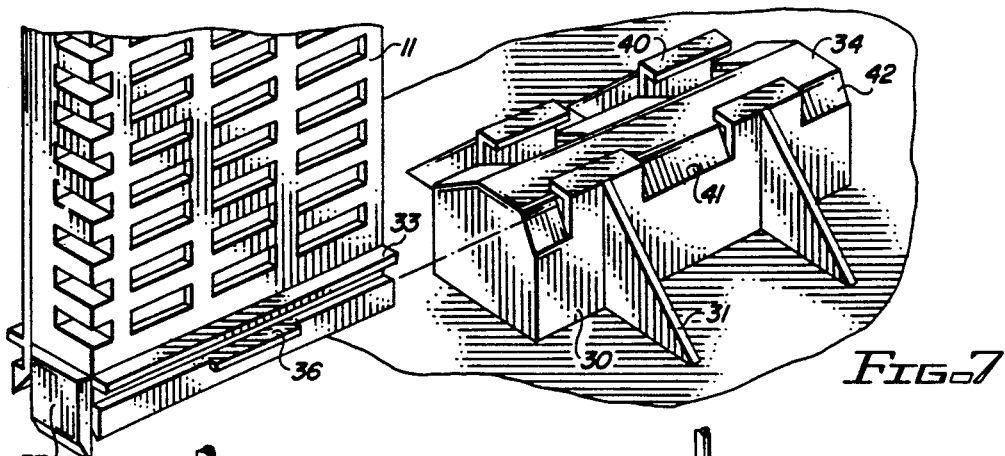
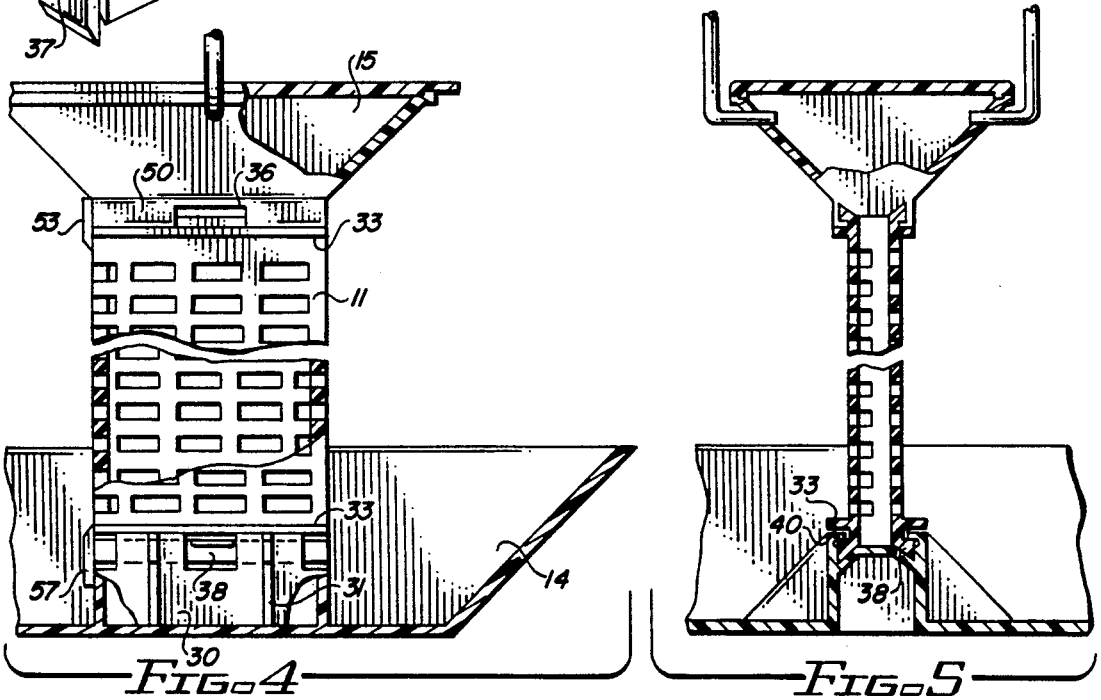
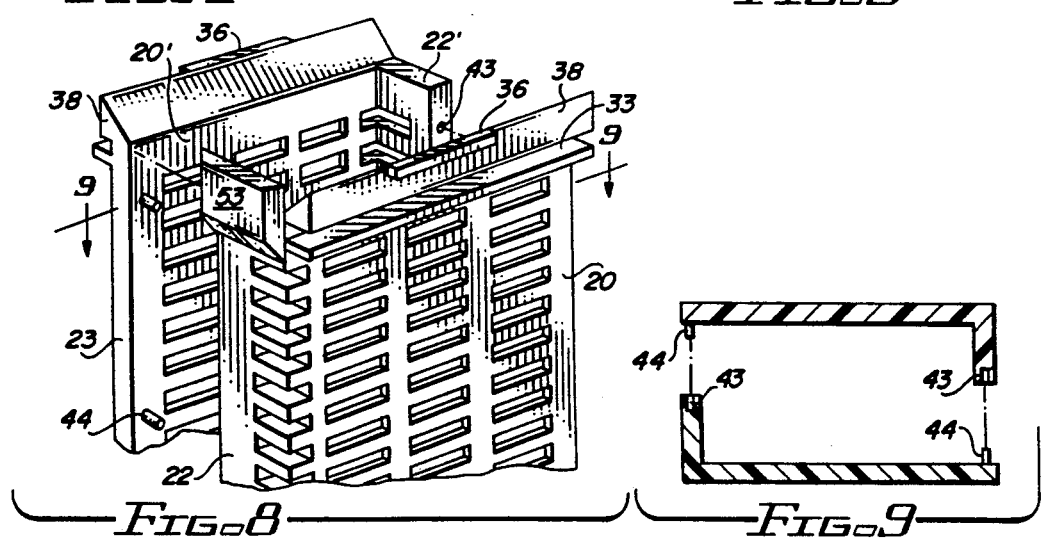

CONTAINER FOR GRANULAR INSECTICIDE

BACKGROUND OF THE INVENTION

This invention relates to a container for a granular insecticide and, in particular, to a bait station for use in attracting and reducing the local fly population.

The fact that livestock operations such as feed lots, dairies, stables and kennels generate conditions that promote the propagation and support of enormous fly populations is well known. These conditions are also present on the grounds of many different types of food processing plants and canneries as well as waste facilities. It is recognized that flies have distinguished themselves throughout history as persistent pests and health threats to both man and animal. Numerous studies have been made documenting flies as carriers of disease. As a result, substantial time and effort has been expended to develop insecticides which can be used to control the fly population. Typically, these insecticides are broadcast throughout entire areas either in the form of sprays or as solids in order to shorten the life of these insects.

Recent studies have now shown that the widespread use of insecticides in an indiscriminate manner has far greater ramifications than originally though when the impact on man and his environment is examined. Consequently, there has been increasing interest generated in localized trapping of insects in order to prevent the constituents of the insecticides from entering the food chain. One approach that is finding great favor is to combine the insecticide with one or more specialized attractants to increase the population density of the insects being controlled. The combination serves to draw the flies to a central location which contains the specific agent for eliminating them.

Extensive research has been done in the identification and synthesis of sex attractants for different species of flies. These attractants, generally termed pheromones, are relatively expensive, limiting their widespread application even though they have been shown to be effective. Frequently, the sex attractants have been combined with feeding adjuvants which appeal to the gustatory sense of the insects. Other attractants are those appealing to the olfactory sense of the fly and are often based on nitrogenous materials such as trimethylamine and ammonia. A variety of combinations of different attractants have been tested and successfully used as fly baits. The development of fly baits comprised of one or more attractants and insecticide in liquid form enables solid carriers such as sugar, clay, ground peanut hulls or other inert materials to be impregnated with the liquid mixture and used as a solid scatter bait. One such fly bait found to be particularly successful in controlling the fly population is the Apache Fly Bait manufactured and sold by the Farnam Companies, Inc. of Phoenix, Ariz.

When used as a scatter bait the mixture is found to be effective only for limited periods since the material is widely dispersed and exposed to the elements. The localized increases in density of the fly population are short-lived since the bait is not concentrated in a large volume at a given point. Furthermore, the release of the attractant is not controlled. In addition, the insecticide utilized may not permit the scatter bait to be used in areas or under circumstances where food-producing animals, pets and children have access thereto.

In order to fully utilize the tremendous potential of the variety of attractants available with different insecticides, it is important to be able to utilize the granules of a solid fly bait in a manner which promotes a controlled release of the attractants and thereby extend the period of efficacy of the fly bait. In addition, the container for the fly bait should deploy the bait in a reasonably large volume to maintain an increased density of the fly population at that location. This feature is important since flies are found to cluster and this tendency should be promoted for control purposes.

Accordingly, it is a primary object of the present invention to provide a container for the controlled use of a fly bait. Furthermore, the present invention is directed to the provision of a bait station having a structure that is both attractive to the flies and confines the bait in an accessible manner above ground. Among the advantages of the invention are the simplification of the manufacturing steps required to produce a bait station and the ability to provide a structure which can be readily assembled by the user without requiring the use of hand tools.

SUMMARY OF THE INVENTION

This invention relates to a container for promoting the controlled access to a granular fly bait. The typical commerical fly bait includes one or more attractant constituents, the killing agent and a carrier. The fly bait is held in a container referred to as a bait station which is placed in the location for the concentration and control of the fly population.

The bait station includes a receiving chamber which in cross-section contains side panels forming a number of angles bounding at least one large area front panel. The front panel includes a multiplicity of slots extending therethrough. In preferred embodiments, the slots are included in the side panels and a panel opposing the front panel. The receiving chamber has open top and bottom sections and suitable closure means are provided therefor.

The slots in the container are dimensioned so that the length and height of a slot permit the insect to insert its feeding parts therein but also serve to maintain the granular fly bait in the container. The slots have an elongated length dimension which increases access to the fly bait material contained within the receiving chamber. The height dimension of the slots is also based on the diameter of the granules so that the fly bait does not come tumbling out of the receiving chamber. In the case of the common fly population, the height dimension of the slots of one-sixteenth inch is appropriate for providing access and retaining granules.

The use of a series of slots is found to appeal to the flies tendency to land on or about angular structures. For that reason, one embodiment successfully tested has utilized a series of side slots which extend into corresponding slots in the front panel. This structure provides an angular landing region for each row of slots distributed across the front of the receiving chamber. As stated, the cross-section of the fly bait receiving chamber includes a number of angles thus further appealing to the fly as a place to land. The use of a rectangular cross-section where there exists a pair of opposing wide panels in combination with a pair of opposing relatively narrow side panels significantly increases the availability of the volume of contained fly bait to flies landing on the bait station and feeding on the bait. The initial attractantcy of the fly bait is primarily a surface phenomenon with the release of gases from the bait stimulating a favorable response in the fly. Once attracted, the fly lands, feeds and dies. By reducing the volume of material that is confined within the centermost portion of the receiving chamber, more of the bait is available to the fly thereby enhancing the efficiency of the device.

The device of the present invention can be constructed of molded plastic using a limited number of molded parts to provide ease of assembly by the user. In addition the top closure can be provided with a hinge to permit refilling of the container. The bottom closure means can be made integral with a large area catchment that captures flies as they end their life cycle. The presence of large number of flies, both alive and dead, in proximity to the slots is believed to add to the efficacy of the container.

Further features and advantages of the invention will become more readily apparent in the following detailed description of two embodiments of the invention when taken in conjunction with the accompanying drawings.

BRIEF DESCRIPTION OF THE DRAWINGS

FIG. 1 is a view in perspective of one embodiment of the invention.

FIG. 2 is an expanded view of the central portion of the receiving chamber.

FIG. 3 is a cross-sectional view taken along line 3—3 of FIG. 1.

FIG. 4 is a partial side view in cross-section showing the attachment of the bottom closure means taken along line 4—4 of FIG. 1.

FIG. 5 is a partial side view in section taken along line 5—5 of FIG. 1.

FIG. 6 is an exploded view showing the assembly of the top closure means.

FIG. 7 is an exploded view showing assembly of the bottom closure means.

FIG. 8 is a partial view in perspective showing assembly of the receiving chamber.

FIG. 9 is a view taken along line 9—9 of FIG. 8.

DESCRIPTION OF THE PREFERRED EMBODIMENTS

Figure 10:
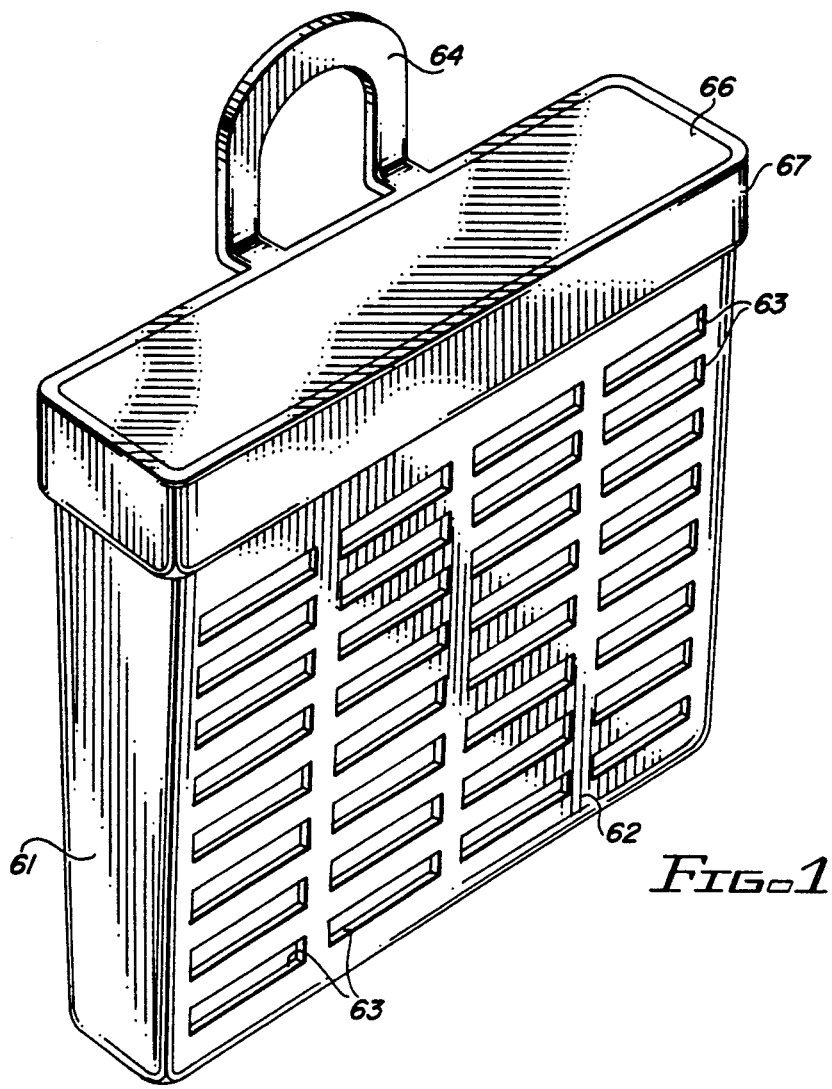
FIG. 10 is a view in perspective of a second embodiment of the invention.

Referring now to FIG. 1, the present invention is shown to include a vertically-disposed receiving chamber 11 attached to a catchment 14 that is locked in place by a slidable locking means 12. The catchment 14 includes the bottom closure means for the receiving chamber 11. A top closure means 15 is fastened to the receiving chamber 11 by similar locking means 18 to form an integral structure. A hinged lid 17 is provided at the top of the closure means 15 to permit the placement of the granular material therein. Hanger 16 comprised of a formed wire is provided so that the device may be suspended in use at a given location in the position shown in FIG. 1.

The central portion of receiving chamber 11 outlined by circle 2 in FIG. 1 is shown in greater detail in FIG. 2. Front panel 20 and side panel 22 are formed as a molded unit and are angularly disposed so that rectangular combination slots 24 are formed both in the side panel 22 and the front panel 20. Slots 24 are characterized by an angular protrusion at the intersection of the planes of the front and side panels. In addition, the large area front panel 20 contains a multiplicity of rectangular slots 21 formed in rows and columns. The slots are shown as being elongated so that the width dimension is several times that of the height dimension. The height dimension of the slots is approximately equal to the average diameter of the granular fly bait used so that the bulk of the fly bait is confined within the receiving chamber. Any fly bait granules that do exit through the rectangular slots fall to the catchment 14 therebelow. More importantly, the height of the slots is sufficient to permit a fly to insert its feeding parts through the slot and into the contained fly bait. In the case of most house fly and pest fly species the height of the slot is 1/16 inch in dimension.

The receiving chamber is rectangular in cross-sectional area thereby providing for right angles with adjacent surfaces on the opposing corners of the structure. This configuration provides ease of manufacture and assembly. However, other arrangements of front and side panels can be used to create the angles found attractive as landing areas by flies. In particular, a receiving chamber having a triangular cross-section could be utilized if desired.

The bottom section of the receiving chamber is slidably attached to a broad area catchment 14. At the approximate center of the catchment 14 is located a pediment 30 maintained in an upright position by ribs 31. The cross-section taken along lines 3—3 of FIG. 1 shows a combination slot 24 along with a plurality of front panel slots 28. The granular insecticide 32 is shown contained within the receiving chamber 11. A pair of stabilizing flanges 33 are seen extending outwardly from the receiving chamber to provide stabilization to the structure when it is assembled by the user.

The assembly of the receiving chamber 11 is shown in detail in FIGS. 8 and 9. The receiving chamber of the present embodiment is shown in FIG. 8 as being constructed in two identical parts of molded plastic. Front panel 20 is shown having a side piece 22 made integral therewith. Similarly, the opposing large area panel 20' is provided with a side section 22'. Both of these pieces contain a stabilizing flange 33 spaced from an overlying guide member 38. A stop 37 is formed at one end of the front panel 20 to limit movement during and after assembly of the embodiment. The mating piece 20' contains a stop at the same place but at the bottom section of the assembled receiving chamber since the assembly of the identical parts requires an end-for-end rotation. As noted in FIG. 9, the securing pins 44 are inserted into mating holes 43. The pins frictionally engage the adjacent walls of the mating holes to form the rectangular receiving chamber.

The assembly of the sections 20 and 20' provide a receiving chamber 11 as shown in FIG. 6 positioned to receive the top closure 15. The top section of chamber 11 is provided with a pair of guide members 38 with a detent 36 located thereon. Spaced beneath the guide members 38 is a longitudinal stabilizing flange 33. The top closure means 15 includes a pair of spaced longitudinal spacers 54 having inwardly extending support flanges 50 thereon. A central opening 51 is provided in the spacer 54 to receive detent 36 when the assembly is made. A stop 55 is located at one end of the spacers to limit movement of the guides 38 during assembly. An end guide 52 with angled receiving surfaces is located at the opposing end of the longitudinal spacers 54. The receiving surfaces aid in the registration of the guide members 38 of the receiving chamber during assembly.

The stabilizing flanges extend over the support flanges 50 to improve the rigidity of the assembled product.

The assembled device is shown in FIGS. 4 and 5 in partial section. The top closure 15 is secured to the top section of receiving chamber 11 by spacers 50 and flange 54, shown in FIG. 6. In addition, the stabilizing flange 33 extends across the top of the receiving chamber. Stop 55 is located to limit movement of the device in combination with detent 36. At the base of the structure, catchment 14 is secured to the bottom section of the chamber as shown in FIG. 7. The pediment 31 with its angled receiving surfaces 42 noted in FIG. 7 receive the corresponding angled surfaces of guides 38. Support flanges 40 extend over the guides 38 and the overlying stabilizing flange 33 attached to the bottom of the receiving chamber 11 complete the rigid structure. The relationship between the stabilizing flanges 33, support flanges 40 and guide members 38 is shown more clearly in FIG. 5 which is a partial cross-section of the assembled device. It is important to note, the use of the guide members 38, stabilizing flanges 33, a single stop 37 and a single detent 36 enable the receiving chamber 11 to be fabricated from two identical pieces as shown in FIG. 8. The slidable securing elements for the top section and bottom section of the receiving chamber require the same action by the assembler to complete the device. Thus, a bait station consisting of four injection-molded pieces, two of which are identical, can be manufactured at relatively low cost and readily assembled by the purchasers.

The provision of a hinged lid 17 for the top funnel-shaped section enables the purchaser to continually refill the receiving chamber of this embodiment for further use. The hanger 16 enables the device to be suspended and, as mentioned, any movement of the device by wind or otherwise which tends to dislodge the fly bait results in any dislodged granules being retained in the catchment rather than ending up on the ground.

Figure 11:
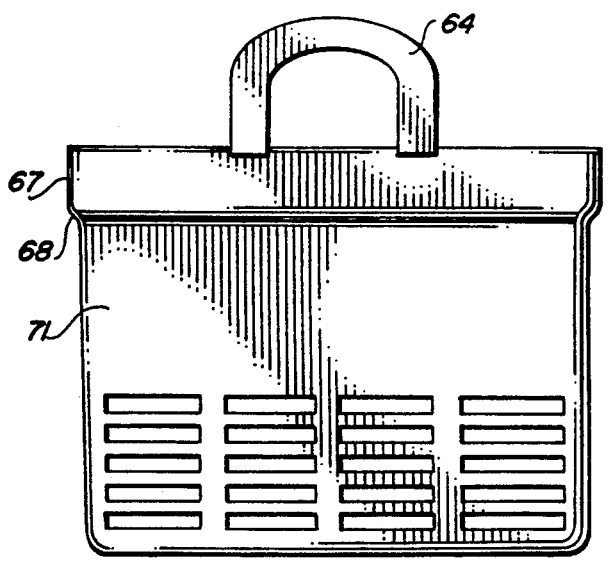
FIG. 11 is a rear view of the embodiment of FIG. 10.
Figure 12:
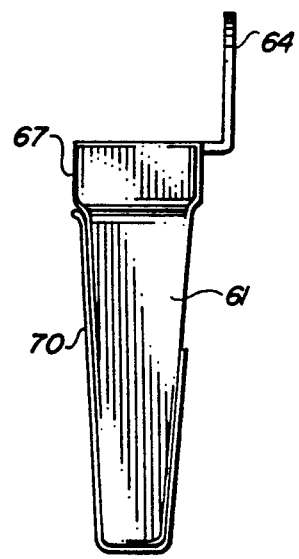
FIG. 12 is a side view of the embodiment of FIG. 10.

Another embodiment of the invention is shown in FIG. 10 wherein front panel 62 is provided with a plurality of rectangular slots 63 oriented in rows and columns. In this embodiment, the front panel 62, adjacent side sections 61 and the rear section 71 are formed of a single molded piece. The cross-sectional area of the receiving chamber is substantially rectangular to provide the angular corners that flies tend to favor as landing places. The height and width dimensions of the rectangular slots 63 are similar to that described in connection with the first embodiment. At the top of the receiving chamber as shown in FIG. 11 and 12 is provided with a transition region of increasing thickness 68 and a reinforced top section 67. This embodiment is a disposable bait station and the fly bait granules are placed in the receiving chamber prior to the insertion of top closure means 66. The top closure means is adhered to the adjacent portion of the reinforced region by conventional means depending on the type of material used. A hanging loop 64 is provided for the second embodiment.

The rear panel 71 is provided with a series of rectangular slots as shown. During manufacture, a foil cover 70 is releasably adhered to the entire front panel 62 and the portion of the rear section 71 containing slots. Then, the fly bait granules are added to the receiving chamber and the top closure means 66 placed and adhered to reinforced region 67.

During normal use, the embodiments are suspended and the gasses given off by the attractant components of the granules are sensed by the flies. The multiplicity of formed angles both on the exterior surface of the embodiments as well as the use of rectangular slots provide a very large number of attractive landing places. The combination of a fly bait with its attractant and insecticidal qualities coupled with this novel structure appealing to the fly's attraction to non-uniform surfaces has been found to provide a highly effective bait station. The product is marketed as the Apache Fly Bait Station for use in combination with a Metholmyl insecticide and Z-9 Tricosene as the pheromone used as an attractant. While the description has referred to embodiments designed with the height dimension of the slots approximately equal to 1/16 inch so as to accommodate the feeding parts of the house fly, other embodiments designed to attract different insects can utilize different height dimensions. The size of the granular material added to the receiving chamber is selected so that essentially all of the material is retained in the chamber. By virtue of the elongated cross-sectional area of the receiving chamber, a significant portion of the fly bait is available for feeding. The amount of bait contained in the central core which is effectively unavailable to flies is significantly reduced. While the foregoing description has referred to preferred embodiments of the invention, it is to be recognized that variations and modifications may be made therein without departing from the scope of the invention as claimed.

What is claimed is:

1. A container for a granular insecticide which comprises:
   a) a receiving chamber having a substantially rectangular cross-section and formed by a pair of opposing wide front panels and a pair of opposing narrow side panels, said chamber having an open top section and an open bottom section;
   b) first and second spaced pairs of guide members affixed to the top and bottom sections of said chamber;
   c) a multiplicity of slots formed in at least one front panel, said multiplicity of slots being positioned to form rows and columns, said rows extending across the front panel whereby slots in said rows extend to at least one edge of the front panel, said columns extending downwardly from the top section to the bottom section;
   d) top closure means including first receiving means for slidably receiving said first pair of guide members therein, and
   e) bottom closure means including second receiving means for slidably receiving said second pair of guide members therein, a granular insecticide introduced into the receiving chamber being made available to insects through the slots in the chamber.

2. The invention in accordance with claim 1 wherein each of said receiving means includes at least one opening for receiving a detent therein, and at least one of the guide members in said pairs including a detent to be received in said opening.

3. The invention in accordance with claim 2 further comprising stabilizing flanges formed on said front panels, each flange being spaced from one of said guide members, and said receiving means including support flanges extending inwardly between the stabilizing flanges and adjacent guide means to support the receiving chamber between the top and bottom closure means.

4. The invention in accordance with claim 3 further comprising stop means located at one end of each pair of guide means, to limit movement of the receiving chamber in said top and bottom closure means.

* * * * *